US010924391B2

(12) United States Patent
Kaliyamoorthy et al.

(10) Patent No.: US 10,924,391 B2
(45) Date of Patent: Feb. 16, 2021

(54) SYSTEMS AND METHODS FOR AUTOMATIC TRAFFIC RECOVERY AFTER VRRP VMAC INSTALLATION FAILURES IN A LAG FABRIC

(71) Applicant: DELL PRODUCTS L.P., Round Rock, TX (US)

(72) Inventors: Karthi Kaliyamoorthy, Chennai (IN); Sampath Kumar Rajamanickam, Chennai (IN); Rajashekar Jayaraj, Chennai (IN); Balamurugan Shanmugam, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 16/374,730

(22) Filed: Apr. 3, 2019

(65) Prior Publication Data

US 2020/0322260 A1    Oct. 8, 2020

(51) Int. Cl.
*H04L 12/703* (2013.01)
*H04L 12/741* (2013.01)

(52) U.S. Cl.
CPC .............. *H04L 45/28* (2013.01); *H04L 45/54* (2013.01)

(58) Field of Classification Search
CPC ....................................................... H04L 45/28
See application file for complete search history.

(56) References Cited

U.S. PATENT DOCUMENTS

| 6,556,547 B1 * | 4/2003 | Srikanth ................. H04L 45/00 370/317 |
| 7,881,208 B1 * | 2/2011 | Nosella ............. H04L 29/12028 370/220 |
| 2005/0138517 A1 * | 6/2005 | Monitzer ............ G06F 11/2025 714/746 |
| 2009/0016215 A1 * | 1/2009 | Nadas ..................... H04L 45/02 370/230 |
| 2015/0113315 A1 * | 4/2015 | Thathapudi ......... H04L 12/4641 714/4.11 |

* cited by examiner

*Primary Examiner* — Edan Orgad
*Assistant Examiner* — Won Tae C Kim
(74) *Attorney, Agent, or Firm* — North Weber & Baugh LLP

(57) ABSTRACT

Presented herein are systems and methods that provide traffic recover when virtual router redundancy protocol (VRRP) virtual media access control (VMAC) failures occur in a link aggregation group fabric environment. In one or more embodiments, automatic traffic recovery may be accomplished using internode link control messages to synchronize a VRRP VMAC failure that has been encountered by one LAG node with a LAG peer node. If a database associated with the failed LAG node comprises no entry that indicates that the failure scenario has previously occurred in the LAG peer node, a forwarding path entry rule may be generated to route traffic via the internode link, thereby, reducing data loss through routing failures and the like.

20 Claims, 8 Drawing Sheets

SYSTEMS AND METHODS FOR AUTOMATIC TRAFFIC RECOVERY AFTER VRRP VMAC INSTALLATION FAILURES IN A LAG FABRIC

BACKGROUND

A. Technical Field

The present disclosure relates generally to information handling systems. More particularly, the present disclosure relates to systems and methods for automatic traffic recovery after virtual router redundancy protocol (VRRP) virtual media access control (VMAC) installation failures in a Link Aggregation Group (LAG) fabric.

B. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems comprising networking systems comprise a switching network with two or more LAG peer nodes. In such systems, if one of the LAG node experiences a VRRP VMAC installation failure, this typically results in routing failures in which traffic is dropped at the L3 level and flooding occurs at the L2 level. Accordingly, it is desirable to provide improved traffic recovery systems and methods for networking systems that comprise two or more LAG peer nodes that are subject to VRRP VMAC installation failures.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

DETAILED DESCRIPTION OF THE PREFERRED EMBODIMENTS

Figure 1:
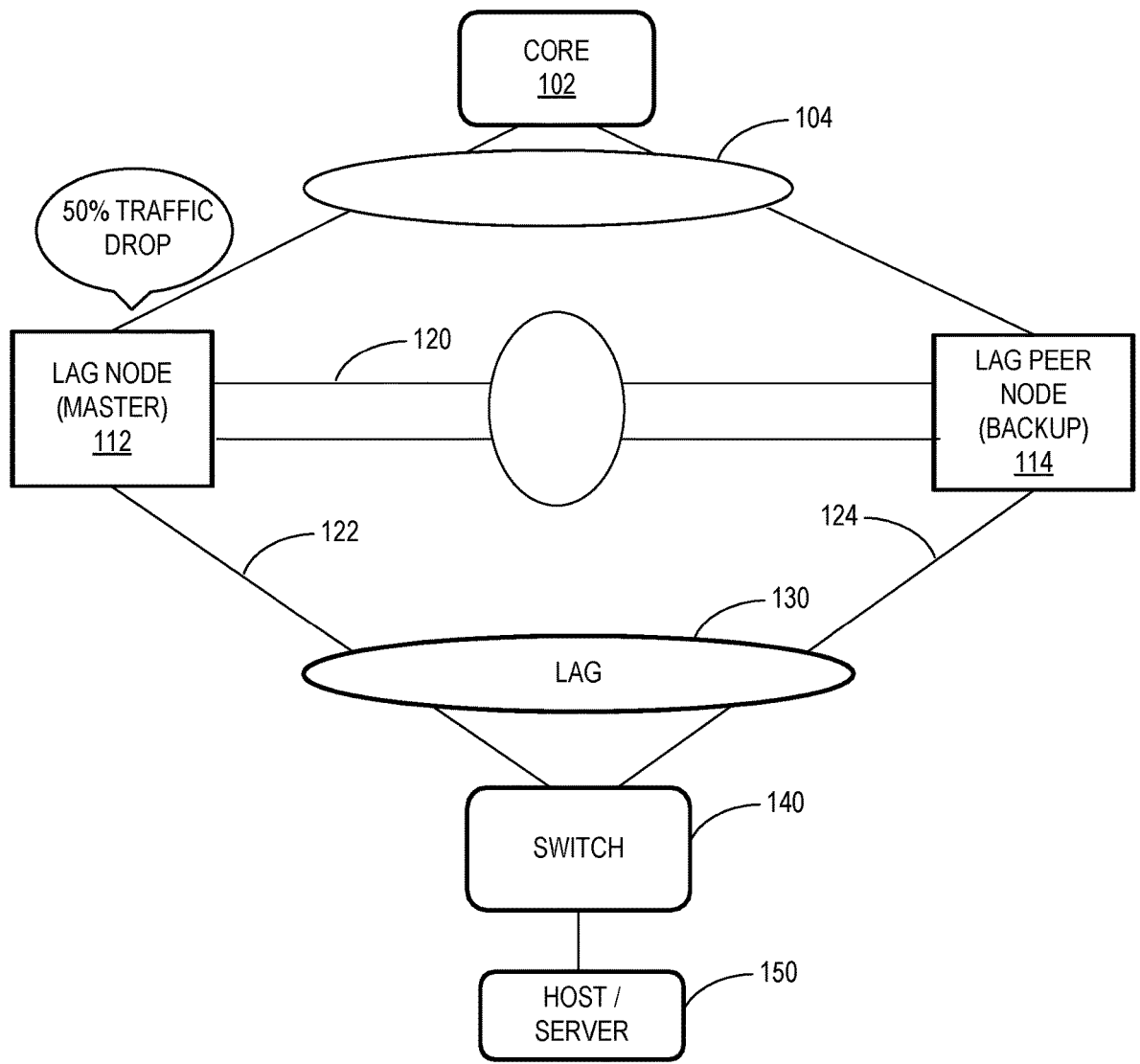
FIG. 1 illustrates the effect of a VRRP VMAC routing failure in an exemplary switching network topology comprising two LAGs.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell."

It shall be noted that: (1) certain steps may optionally be performed; (2) steps may not be limited to the specific order set forth herein; (3) certain steps may be performed in different orders; and (4) certain steps may be done concurrently. It shall also be noted that although embodiments described herein may be within the context of routers or switches, aspects of the present disclosure are not so limited. Accordingly, the aspects of the present disclosure may be applied or adapted for use in other contexts.

All documents cited herein are incorporated by reference herein in their entirety. The terms "VRRP VMAC entry failure," "VRRP VMAC failure," "VMAC entry failure," and "VMAC failure" are used interchangeably.

FIG. 1 illustrates the effect of a VRRP VMAC routing failure in an exemplary switching network topology comprising two LAGs. Switching network 100 in FIG. 1 comprises core 102, LAG peer nodes 112 and 114, INL 120, LAG 130, switch 140, and host or server 150. Switch 140 is coupled to LAG peer nodes 112, 114 via LAG 130.

Network 100 typically operates using the VRRP that, among other things, elects and configures or initializes one of LAG peer nodes 112, 114 as the higher-priority node, i.e., the LAG master node 112, and the other node(s) as lower-priority node(s) that is (are) assigned the role of LAG backup node, here, LAG node 114. INL 120 is used to transfer a control protocols according to the VRRP between LAG peer nodes 112, 114.

In regular operation, only master LAG node 112 performs an ARP reply in response to an ARP request for a virtual IP from connected hosts. In scenarios where master LAG node 112 becomes inoperative or encounters a failure, Secondary LAG node 114 takes over the role of a master.

Typically, all VRRP groups install a VRRP VMAC (or short VMAC) entry in a table in a LAG peer node 112, 114. When a packet arrives at a VRRP router, such as LAG peer node 112 or 114, the router checks for the presence of the VMAC entry, and if there is no VMAC entry present, e.g., due to a failure scenario that has occurred, the traffic gets dropped at L3 level, and flooding occurs at the L2 level, including on the INL.

For example, LAG node 112 will look up a VMAC address in its table, and if there is a failure, 50% of the traffic from north-to-south, i.e., from host 150 to core 102, will be dropped and, thus, will not reach core 102. In addition, all hosts connected to ports associated with LAG node 112 will receive unnecessary traffic due to the built-in flooding mechanism, thus, unnecessarily consuming bandwidth. One skilled in that art will recognize that similar flooding will occur on the LAG backup node 114.

Therefore, it would be desirable to have systems and methods that provide improved traffic recovery after a VRRP VMAC installation failure occurs in a LAG fabric that comprises two or more LAG nodes.

Figure 2:
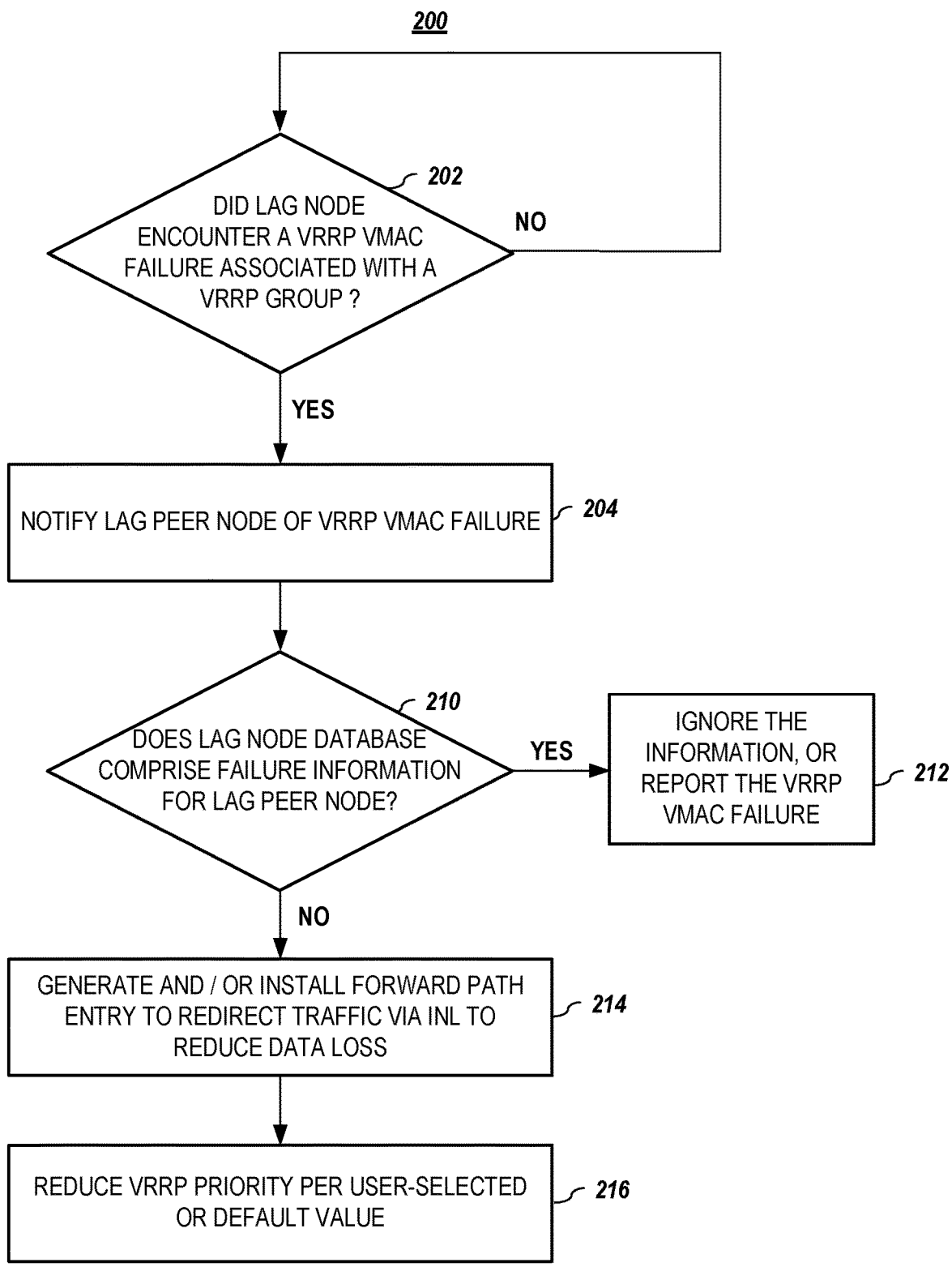
FIG. 2 is a flowchart of an illustrative process for VRRP VMAC routing failure recovery, according to embodiments of the present disclosure.

FIG. 2 is a flowchart of an illustrative process for VRRP VMAC routing failure recovery, according to embodiments of the present disclosure. Process 200 begins by determining (202) whether a LAG node has encountered a VRRP VMAC failure that is associated with a VRRP group. If so, then, in embodiments, a peer node of the LAG node may be notified (204) of the VRRP VMAC failure that has occurred in the LAG node. The communication between the peer nodes may comprise indicating interface and MAC information, e.g., by using a LAG control message such as VLT Redis.

In embodiments, the LAG peer node, upon receiving notification of the failure associated with the LAG node, may update its database to reflect the failure. As one result, if that particular entry failure occurs again later on, the LAG peer node will be able to recognize the failure, e.g., as a double failure further discussed in greater detail below. In addition, the LAG node may inspect its own database to determine whether the LAG peer node has previously encountered that particular failure.

In embodiments, if it is determined (210) that the LAG database for the LAG node does not comprise information regarding the failure, e.g., a single node failure has occurred, then a forwarding path entry may be generated and/or installed (214), e.g., by a primary LAG node, in order to redirect traffic via an internode link (INL) and, thus, reduce data loss that may otherwise occur due to the VRRP VMAC failure. Advantageously, the presented failure recovery mechanisms consume a relatively small amount of CPU resources.

In embodiments, if it is determined (210) that the LAG database for the LAG node does, in fact, comprise information regarding the VRRP VMAC failure, then, in embodiments, that information may be ignored or reported (212), e.g., to a user or system administrator.

Once the forwarding path entry is created, in embodiments, an interface VRRP priority of the LAG group may be reduced (216), e.g., per user-selected or default value, such that the LAG peer node can automatically transition from a VRRP standby node to a VRRP master node and assume tasks associated with a master VRRP master node. In embodiments, taking over the new role of master node, enables the LAG peer node to properly respond to PING and ARP requests, such that in addition to preventing traffic failures and unwanted flooding, PING failures may also be prevented. As a result, VRRP may achieve traffic recovery for VRRP groups.

Figure 3:
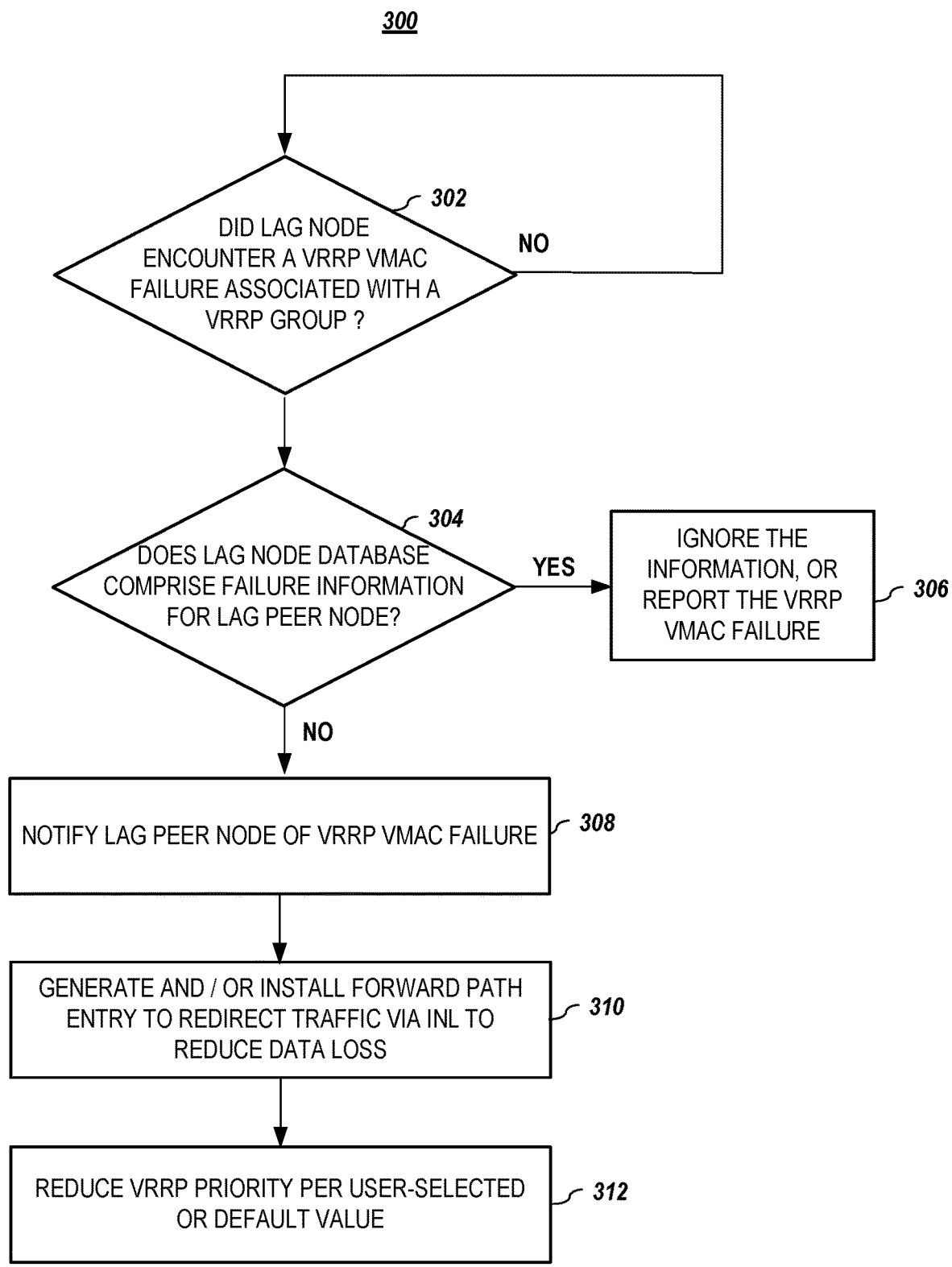
FIG. 3 depicts an alternate process for VRRP VMAC routing failure recovery according to embodiments of the present disclosure.

FIG. 3 depicts an alternate process for VRRP VMAC routing failure recovery, according to embodiments of the present disclosure. Process 300 begins by determining (302) whether a LAG node has encountered a VRRP VMAC failure that is associated with a VRRP group.

In embodiments, if it is determined (304) that the LAG database for the LAG node does not comprise information regarding the failure, a peer node of the LAG node may be notified (308) of the VRRP VMAC failure that has occurred in the LAG node.

A forwarding path entry may be generated and/or installed (310) to redirect traffic via an INL to reduce data loss.

If it is determined (304) that the LAG database for the LAG node does comprise information regarding the VRRP VMAC failure, then, in embodiments, that information may be ignored or reported, (306) e.g., to a user or system administrator. In embodiments, once the forwarding path entry is created, an interface VRRP priority of the VRRP group may be reduced (312), e.g., to a predetermined default value.

Figure 4:
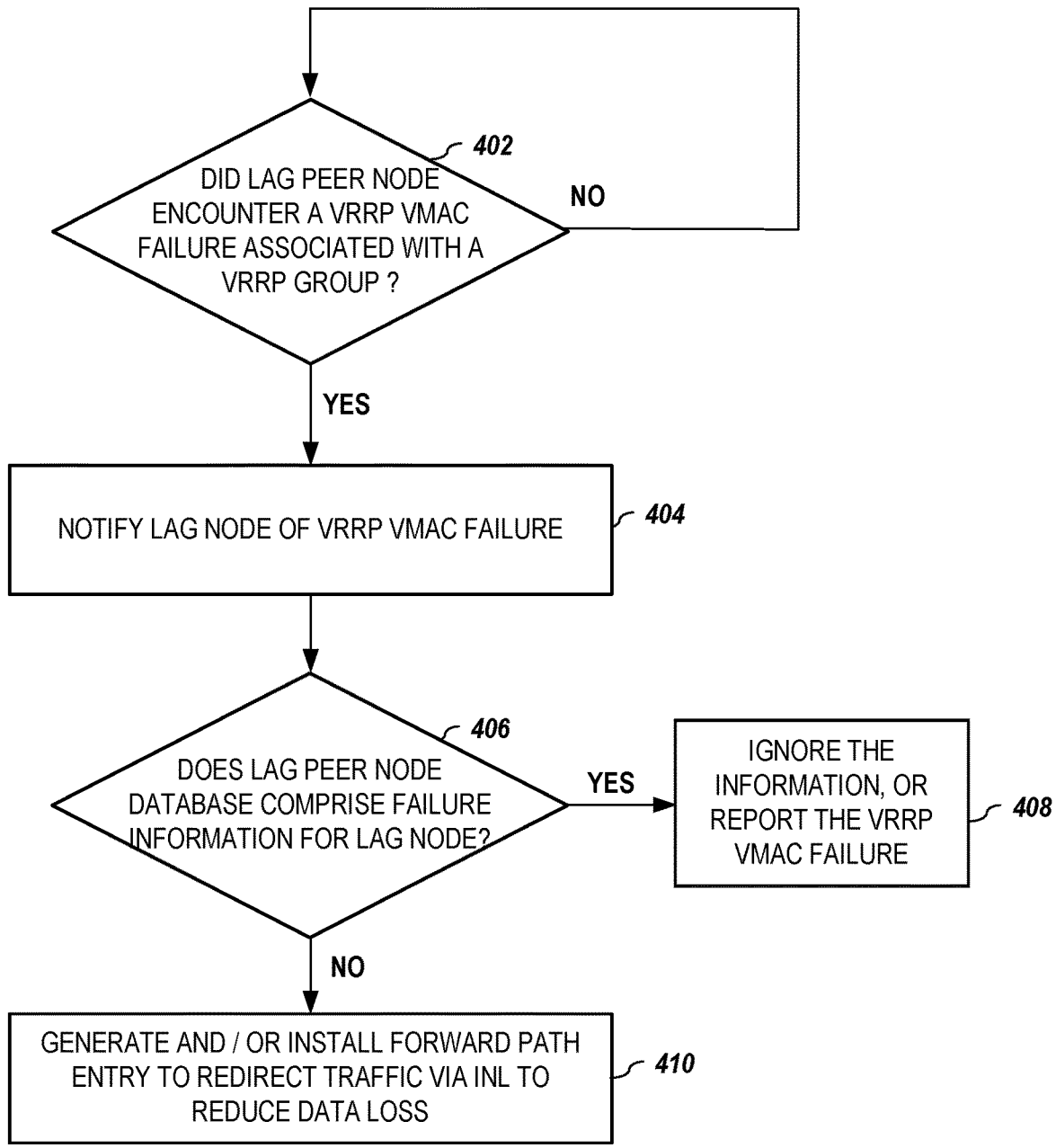
FIG. 4 depicts yet another process for VRRP VMAC routing failure recovery, according to embodiments of the present disclosure.

FIG. 4 depicts another process for VRRP VMAC routing failure recovery, according to embodiments of the present disclosure. Process 400 begins by determining (402) whether a LAG node has encountered a VRRP VMAC failure. If so, in embodiments, a peer node of the LAG node may be notified (404) of the failure. If it is determined (404) that the LAG database for the LAG node does not comprise information regarding the failure, then, in embodiments, a forwarding path entry may be generated and/or installed (410) to redirect traffic via an INL to reduce data loss.

Conversely, if it is determined (406) that the LAG database for the LAG node does comprise information regarding the VRRP VMAC failure, then, in embodiments, that information may be ignored or reported (408).

Figure 5:
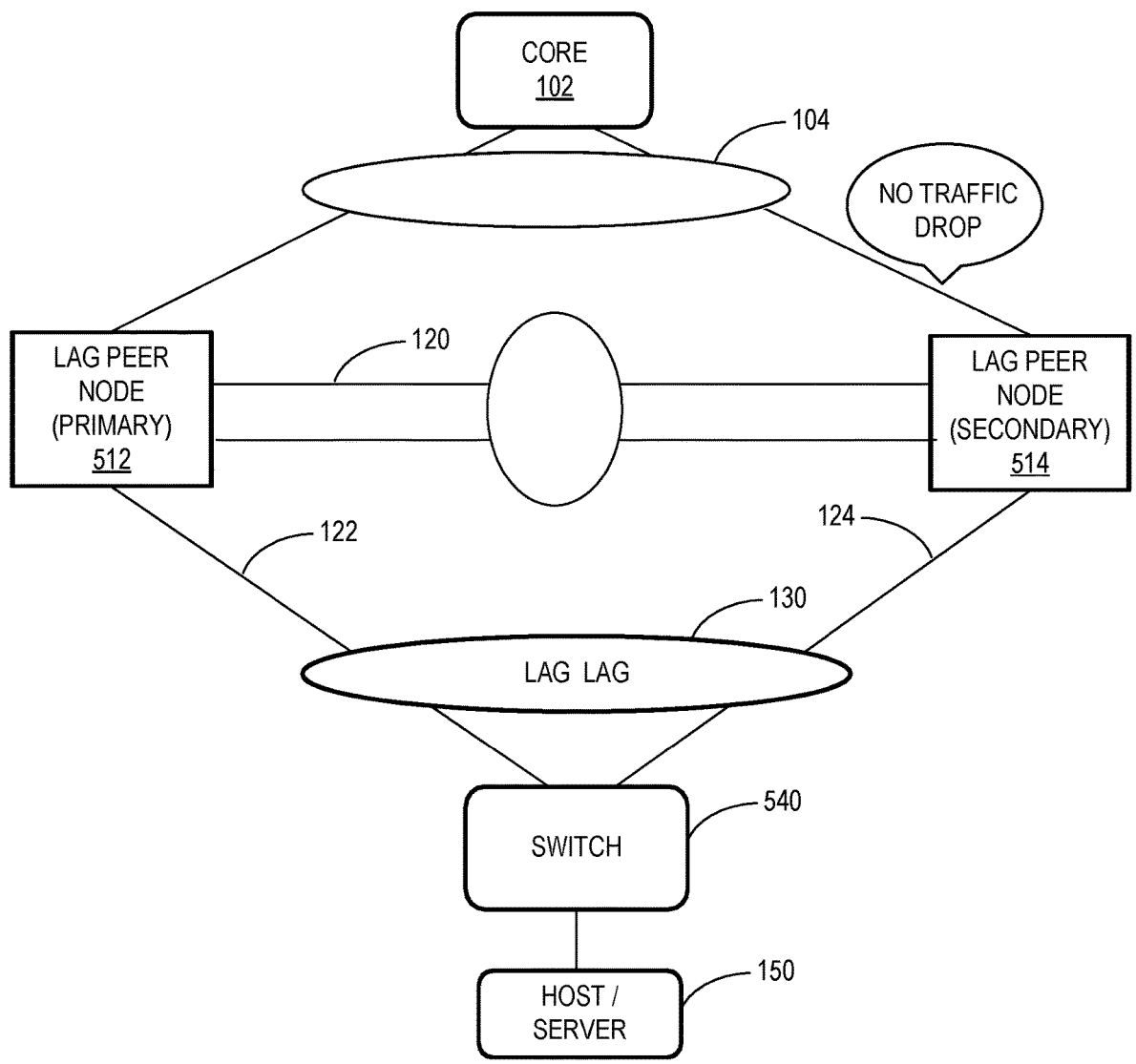
FIG. 5 is an exemplary graph that illustrates the effect of a VRRP VMAC routing failure recovery process on a switching network comprising two LAG nodes, according to embodiments of the present disclosure.

FIG. 5 is an exemplary graph that illustrates the effect of a VRRP VMAC routing failure recovery process on a switching network comprising two LAG nodes, according to embodiments of the present disclosure. Switching network 500 comprises core 102, LAG peer nodes 512 and 514, INL 120, LAG 130, host or server 150, and switch 540 that is coupled to LAG peer nodes 112, 114 via LAG 130.

It is noted that links 122 and 124 may each comprise any number of links. It is further noted that in forming a LAG system, nodes may be connected via one or more links. These links may be referred to as INL, inter-chassis links (INLs), or Virtual Link Trunk interconnect (VLTi)—which terms may be used interchangeably herein. These links may be used to connect nodes together to form the LAG system that, in at least some ways, acts with other network devices as a single larger chassis. INL typically transfers the control protocols periodically using a synch mechanism that synchronizes peer nodes. In embodiments, INL may be used for data traffic.

In FIG. 5, LAG peer node 512 is the primary or master node and LAG peer node 514 is the secondary or LAG backup node. Once Primary LAG node 512 encounters a VRRP VMAC entry failure, e.g., a tertiary CAM (TCAM) failure in a hardware table, various embodiments enhance the LAG synchronization mechanism by communicating and countering a particular VMAC failure on the VLAN interface.

In embodiments, this may be accomplished by LAG primary 512 communicating, in response to encountering a VMAC entry failure, the failure to LAG peer node 514, e.g., a standby or backup node, here, secondary LAG 514. In embodiments, secondary LAG 514, upon receiving notification of the failure associated with its peer primary LAG 512, may update its database to reflect the failure, such that if the failure occurs again, secondary LAG 514 can recognize the failure.

In embodiments, upon primary LAG 512 communicating the VMAC entry failure to the standby node, secondary LAG 514, primary LAG 512 may inspect its own database to determine whether secondary LAG 514 has previously encountered that entry failure. For example, primary LAG 512 may find that its own database indicates that secondary LAG 514 comprises a corresponding VLAN/VMAC entry in a TCAM and/or has notified primary LAG 512 of such entry. In this manner, both LAG nodes 512, 514 may, from time to time, synchronize VRRP MAC failures, e.g., by using LAG-suitable control messages. It shall be understood that the order given here is not intended to limit the scope of the disclosure since, in embodiments, primary LAG 512 may equally well inspect its own database prior to communicating the VMAC entry failure to standby node 514.

In embodiments, if, upon inspection of its database, primary LAG 512 cannot find a listing of such a prior VMAC entry that may have occurred on secondary LAG 514 for a particular VMAC on some VLAN interface, primary LAG 512 may generate and/or use a forwarding path rule that enables hardware to re-route traffic, e.g., to route traffic that ingresses on a LAG link to a particular port, e.g., via INL, to secondary LAG 514. In embodiments, rerouting ensures that secondary LAG 514 comprises the entry for that particular VMAC and that traffic can be routed, here to the core, via INL and secondary LAG 514. In addition, primary LAG 514 may update its own database such that, in effect, both LAG nodes 512, 514 can be aware of each other's VMAC entry issues and may continue to update each other about failures, e.g., TCAM failures, using standard LAG control messages.

In embodiments, in response to detecting a VMAC failure, primary LAG 512 may automatically reduce a VRRP priority of the LAG group, e.g., by a predetermined, user-configurable value, such that secondary LAG 514 can automatically transition from a VRRP standby node to the VRRP master node and take over tasks associated with a VRRP master node. In embodiments, this enables secondary LAG 514 to respond to PING and ARP requests, e.g., to prevent PING failures.

In embodiments, an active-active feature in the VRRP allows the INL to be also used in the reverse direction, i.e., bi-directionally, e.g., in scenarios in where the standby/secondary LAG node 514 encounters a VMAC entry failure, even if PING and ARP requests are replied by a master node. It is understood that in such a scenario, VRRP priorities need not be changed or reversed.

In embodiments, if, upon inspection of its database, primary LAG 512 does find a listing of a prior failure that has occurred on secondary LAG 514 for a particular VMAC on some VLAN interface, e.g., it is a double node routing failure, i.e., a routing failure occurring on both nodes, neither of the two LAG nodes is able to properly route traffic like in a regular VRRP use case. Therefore, in such scenarios, forwarding path rules should not be installed/used to reroute packets to secondary LAG 514 via the INL. Flooding may occur on both nodes at the L2 level, which includes traffic on the INL, and packets may be dropped at the L3 level, e.g., on the internode link between primary LAG 512 and core 102.

In embodiments, host 150 may send out packets that have the VRRP MAC as their destination MAC (DMAC). Once traffic reaches both LAG nodes 512, 514 via LAG LAG 130, e.g., 50% of the traffic may get hashed onto primary LAG 512. In response, primary LAG 512 may first check its TCAM for an entry for this DMAC, and if the entry is found, the packet may be routed to core 102. If the entry is not found, i.e., the check fails (e.g., due to collisions or a TCAM Full scenario), primary LAG 512 may determine, e.g., look up, whether a forwarding packet rule is in place that, for example, directs primary LAG 512 to reroute traffic on INL link 120. If such a rule is present, incoming packets may be routed accordingly.

In some scenarios, a double failure may occur in which, e.g., hash failures occur for the interface in both LAG nodes 512, 514. Advantageously, in embodiments, both LAG nodes 512, 514 would already know about this double failure based on the information exchange enabled by the synchronization process that involves information exchange between LAG nodes 512, 514. As a result, the absence of a forwarding path rule may black hole the traffic on the respective units and not send traffic at the L3 level, and send traffic through the L2 level towards the INL 120 links and to other hosts to flood the broadcast domain. One skilled in the art will appreciate that a system log comprising the VMAC failure may be generated, e.g., to alert a system administrator or user.

In embodiments, in order to reduce the usage of forwarding path regions in memory, a wildcard masked FP rule may be created and installed that comprises a bit mask, e.g., a 64-bit mask, that matches a particular VMAC to failed VLAN interfaces. Advantageously, this reduces the number of rules that need to be created and stored.

Since INL 120 links participate in traffic forwarding even if a particular LAG is down, embodiments of the present disclosure do not overload, e.g., the VLTi bandwidth, such that especially when the encountered issues are transient in nature, they will not exhaust VLTi bandwidth.

Figure 6:
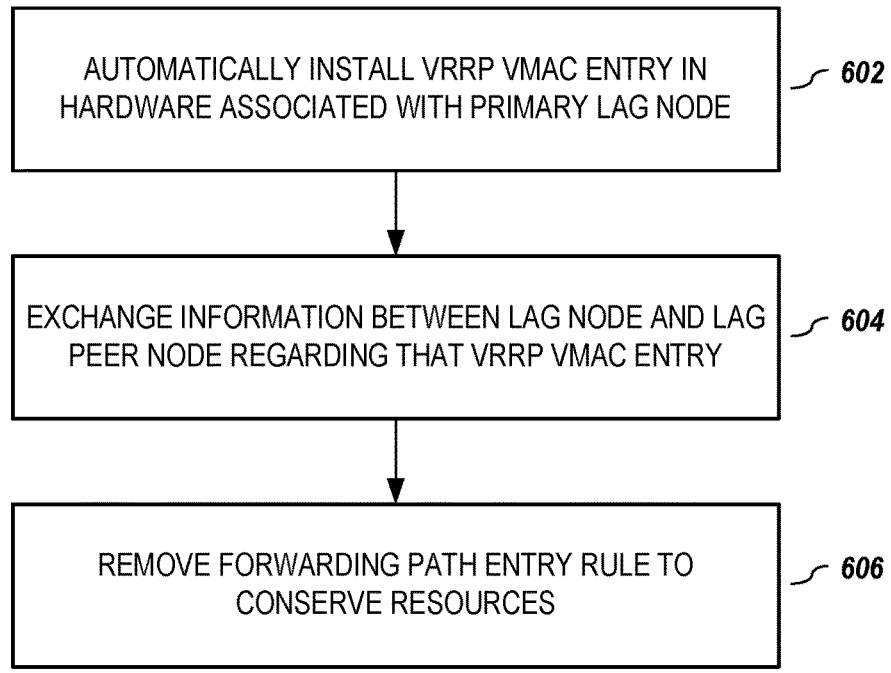
FIG. 6 depicts an exemplary method for removing a forwarding path entry rule to conserve resources, according to embodiments of the present disclosure.

FIG. 6 depicts an exemplary method for removing a forwarding path entry rule to conserve resources, according to embodiments of the present disclosure. Process 600 for removing a forwarding path entry rule begins after the implementation of embodiments of the present disclosure, for example by a primary LAG node that has encountered a failure, by automatically installing (602) a VRRP VMAC entry in hardware, such as a TCAM, associated with a primary LAG node. In embodiments, information may be exchanged (604) between the primary LAG peer node and a secondary LAG peer node regarding the VRRP VMAC entry, for example, over a period of time.

Finally, an existing forwarding path entry rule may be removed (606), for example, to conserve resources such as memory. In embodiments, removal may be performed after auditing the hardware or reloading from the secondary LAG node that became the master node after the primary LAG node has encountered a failure. As a result, both LAG nodes may be synchronized and comprise the same VRRP VMAC entry in their hardware.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 7:
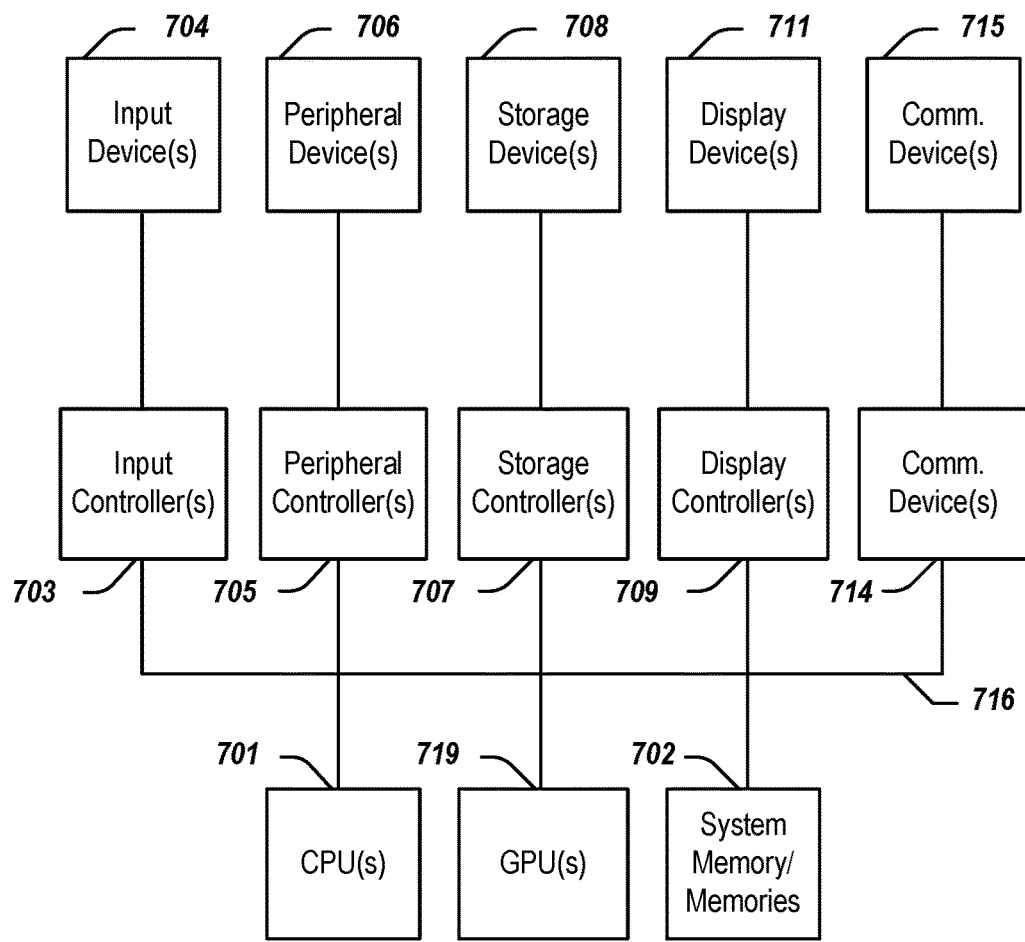
FIG. 7 is a simplified block diagram of an information handling system according to embodiments of the present invention.

FIG. 7 is a simplified block diagram of an information handling system (or computing system) according to embodiments of the present disclosure. It will be understood that the functionalities shown for system 700 may operate to support various embodiments of a computing system—although it shall be understood that a computing system may be differently configured and include different components, including having fewer or more components as depicted in FIG. 7.

As illustrated in FIG. 7, the computing system 700 includes one or more central processing units (CPU) 701 that provides computing resources and controls the computer. CPU 701 may be implemented with a microprocessor or the like, and may also include one or more graphics processing units (GPU) 719 and/or a floating-point coprocessor for mathematical computations. System 700 may also include a system memory 702, which may be in the form of random-access memory (RAM), read-only memory (ROM), or both.

A number of controllers and peripheral devices may also be provided, as shown in FIG. 7. An input controller 703 represents an interface to various input device(s) 704, such as a keyboard, mouse, touchscreen, and/or stylus. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present disclosure. Storage device(s) 708 may also be used to store processed data or data to be processed in accordance with the disclosure. The system 700 may also include a display controller 709 for providing an interface to a display device 711, which may be a cathode ray tube (CRT), a thin film transistor (TFT) display, organic light-emitting diode, electroluminescent panel, plasma panel, or other type of display. The computing system 700 may also include one or more peripheral controllers or interfaces 705 for one or more peripherals 706. Examples of peripherals may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Figure 8:
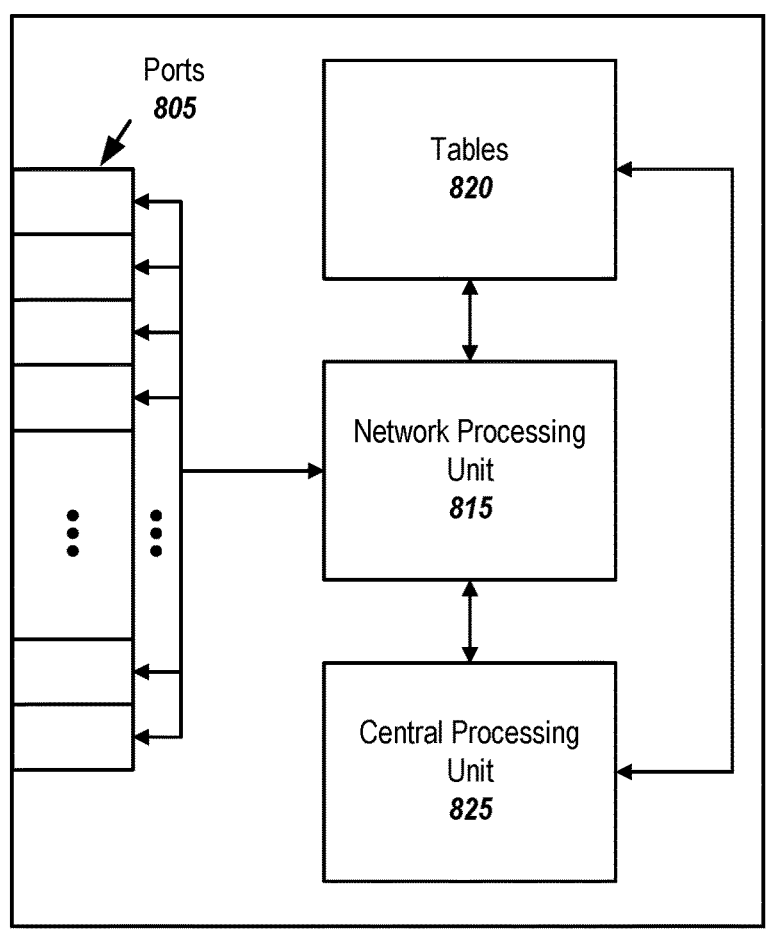
FIG. 8 depicts an alternative block diagram of an information handling system, according to embodiments of the present disclosure.

FIG. 8 depicts an alternative block diagram of an information handling system, according to embodiments of the present disclosure. It will be understood that the functionalities shown for system 800 may operate to support various embodiments of the present disclosure—although it shall be understood that such system may be differently configured and include different components (including fewer or more components).

The information handling system 800 may include a plurality of I/O ports 805, a network processing unit (NPU) 815, one or more tables 820, and a central processing unit (CPU) 825. The system includes a power supply (not shown) and may also include other components, which are not shown for sake of simplicity.

In one or more embodiments, the I/O ports 805 may be connected via one or more cables to one or more other network devices or clients. The network processing unit 815 may use information included in the network data received at the node 800, as well as information stored in the tables 820, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for virtual routing redundancy protocol (VRRP) virtual MAC (VMAC) routing failure recovery, the method comprising:
  responsive to a Link Aggregation Group (LAG) node encountering a VRRP VMAC failure, using a LAG control message to notify a LAG peer node of the VRRP VMAC failure, the LAG node and the LAG peer node being communicatively coupled via an internode link;
  determining whether a database associated with the LAG node comprises an entry that indicates that the VRRP VMAC failure has occurred in the LAG peer node; and
  responsive to the database not comprising the entry that indicates that the VRRP VMAC failure has occurred in the LAG peer node, generating a forwarding path entry rule for the LAG node to route traffic via the internode link to reduce data loss.

2. The method of claim 1, further comprising, if the LAG node is a primary LAG node, responsive to the database not comprising the entry that indicates that the VRRP VMAC failure has occurred in the LAG peer node, reducing a VRRP priority to automatically transition the LAG peer node to a master node to enable VRRP to achieve traffic recovery.

3. The method of claim 2, wherein the LAG node, in response to the LAG node being the primary LAG node and having encountered a failure, performs the steps comprising:
  installing a VRRP VMAC entry in hardware associated with the primary LAG node;
  exchanging information between the LAG node and the LAG peer node regarding that VRRP VMAC entry; and
  removing the forwarding path entry rule to conserve resources.

4. The method of claim 2, wherein reducing the VRRP priority enables the LAG peer node to respond to PING and ARP requests to prevent at least one of flooding, a PING failure, or a traffic failure.

5. The method of claim 2, wherein the VRRP VMAC failure is associated with a VRRP group, and wherein reducing the VRRP priority reduces a VRRP priority of the VRRP group.

6. The method of claim 1, further comprising, responsive to the database comprising the entry that indicates that the VRRP VMAC failure has occurred in the LAG peer node, performing at least one of:
ignoring the entry that indicates that the VRRP VMAC failure has occurred in the LAG peer node; or
reporting the VRRP VMAC failure that occurred in the LAG peer node.

7. The method of claim 1, wherein, in response to receiving interface and MAC information from the LAG node, the LAG peer node updates its own database to reflect a failure associated with the VRRP VMAC failure.

8. An information handling system operating as a Link Aggregation Group (LAG) node, the information handling system comprising:
one or more processors; and
a non-transitory computer-readable medium or media comprising one or more sets of instructions which, when executed by at least one of the one or more processors, causes steps for virtual routing redundancy protocol (VRRP) virtual MAC (VMAC) routing failure recovery to be performed comprising:
responsive to the Link Aggregation Group (LAG) node encountering a VRRP VMAC failure, using a LAG control message to notify a LAG peer node of the VRRP VMAC failure, the LAG node and the LAG peer node being communicatively coupled via an internode link;
determining whether a database associated with the LAG node comprises an entry that indicates that the VRRP VMAC failure has occurred in the LAG peer node; and
responsive to the database not comprising the entry that indicates that the VRRP VMAC failure has occurred in the LAG peer node, generating a forwarding path entry rule for the LAG node to route traffic via the internode link to reduce data loss.

9. The information handling system of claim 8, wherein the non-transitory computer-readable medium or media further comprises one or more sets of instructions which, when executed by at least one of the one or more processors, causes steps to be performed comprising:
the LAG node periodically synchronizing VRRP VMAC failures via one or more LAG control messages with the LAG peer node to update each other.

10. The information handling system of claim 9, wherein the non-transitory computer-readable medium or media further comprises one or more sets of instructions which, when executed by at least one of the one or more processors, causes steps to be performed comprising, if the LAG node is a primary LAG node, responsive to the database not comprising the entry that indicates that the VRRP VMAC failure has occurred in the LAG peer node, reducing a VRRP priority to automatically transition the LAG peer node to a master node to enable VRRP to achieve traffic recovery.

11. The information handling system of claim 10, wherein the non-transitory computer-readable medium or media further comprises one or more sets of instructions which, when executed by at least one of the one or more processor sp to s, performed comprising:
in response to the LAG node being the primary LAG node and having encountered a failure, performing the steps comprising:
automatically installing a VRRP VMAC entry in hardware associated with the primary LAG node;
exchanging information between the LAG node and the LAG peer node regarding that VRRP VMAC entry; and
removing the forwarding path entry rule to conserve resources.

12. The information handling system of claim 10, wherein reducing the VRRP priority enables the LAG peer node to respond to PING and ARP requests to prevent at least one of flooding, a PING failure, or a traffic failure.

13. The information handling system of claim 8, wherein the non-transitory computer-readable medium or media further comprises one or more sets of instructions which, when executed by at least one of the one or more processors, causes steps to be performed comprising generating a wildcard-masked forwarding path rule associated with failed interfaces to enhance the utilization of forwarding path regions.

14. A non-transitory computer-readable medium or media comprising one or more sequences of instructions which, when executed by at least one processor, causes steps to be performed comprising:
responsive to a Link Aggregation Group (LAG) node encountering a VRRP VMAC failure, using a LAG control message to notify a LAG peer node of the VRRP VMAC failure, the LAG node and the LAG peer node being communicatively coupled via an internode link;
determining whether a database associated with the LAG node comprises an entry that indicates that the VRRP VMAC failure has occurred in the LAG peer node; and
responsive to the database not comprising the entry that indicates that the VRRP VMAC failure has occurred in the LAG peer node, generating a forwarding path entry rule for the LAG node to route traffic via the internode link to reduce data loss.

15. The non-transitory computer-readable medium or media of claim 14, wherein the LAG node and the LAG peer node periodically synchronize VRRP VMAC failures via one or more LAG control messages to update each other.

16. The non-transitory computer-readable medium or media of claim 15, further comprising, if the LAG node is a primary LAG node, responsive to the database not comprising the entry that indicates that the VRRP VMAC failure has occurred in the LAG peer node, reducing a VRRP priority to automatically transition the LAG peer node to a master node to enable VRRP to achieve traffic recovery.

17. The non-transitory computer-readable medium or media of claim 16, wherein the VRRP VMAC failure is associated with a VRRP group, and wherein reducing the VRRP priority reduces a VRRP priority of the VRRP group.

18. The non-transitory computer-readable medium or media of claim 16, wherein reducing the VRRP priority enables the LAG peer node to respond to PING and ARP requests to prevent at least one of flooding, a PING failure, or a traffic failure.

19. The non-transitory computer-readable medium or media of claim 16, wherein the LAG node, in response to the LAG node being the primary LAG node and having encountered a failure, performs the steps comprising:
automatically installing a VRRP VMAC entry in hardware associated with the primary LAG node;
exchanging information between the LAG node and the LAG peer node regarding that VRRP VMAC entry; and
removing the forwarding path entry rule to conserve resources.

20. The non-transitory computer-readable medium or media of claim 14, wherein a wildcard-masked forwarding path rule associated with failed interfaces is generated to enhance the utilization of forwarding path regions.

\* \* \* \* \*